No. 758,713. Patented May 3, 1904.

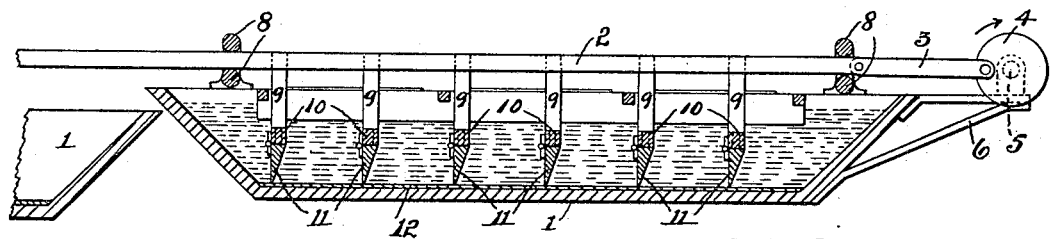
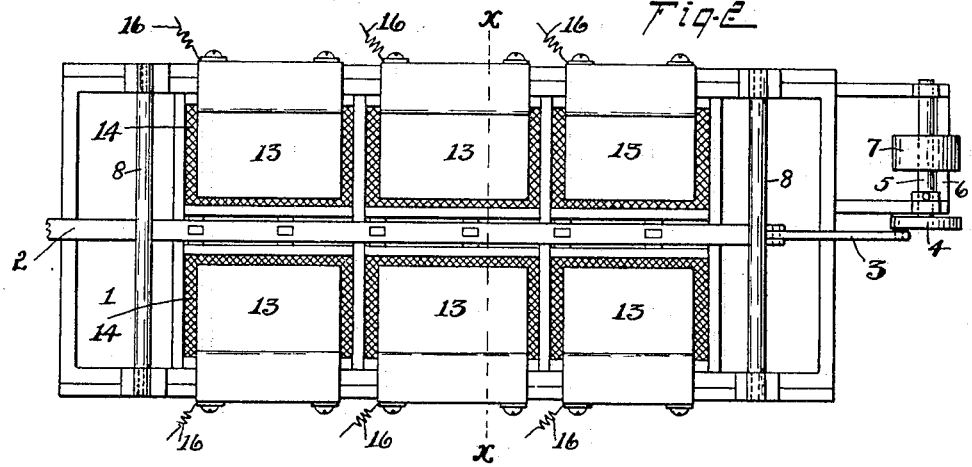
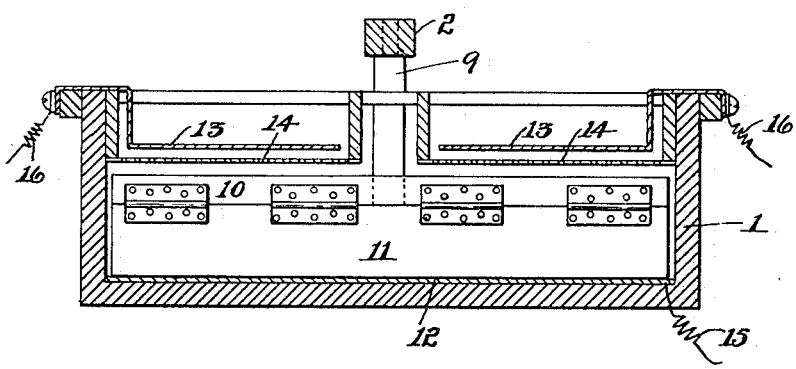

UNITED STATES PATENT OFFICE.

GEORGE W. STEAD, OF PHILADELPHIA, PENNSYLVANIA.

LEACHING APPARATUS.

SPECIFICATION forming part of Letters Patent No. 758,713, dated May 3, 1904.

Application filed July 26, 1902. Serial No. 117,079. (No model.)

*To all whom it may concern:*

Be it known that I, GEORGE W. STEAD, a citizen of the United States, residing in the city and county of Philadelphia, in the State of Pennsylvania, have invented certain new and useful Improvements in Leaching Apparatus, of which the following is a full, clear, and exact description, reference being had to the accompanying drawings, of which—

Figure 1 is a vertical longitudinal section. Fig. 2 is a plan view. Fig. 3 is a section as on line *x x*, Fig. 2, the guide-rollers for the reciprocating bar being omitted.

My invention is designed for use in those processes for extracting metals from ores wherein the ore is brought into contact with chemical solutions or electrolytes in a suitable receptacle; and the object of the invention is to provide an apparatus wherein at the same time that the liquid is agitated the ore fed in at one end of the receptacle is carried forward progressively and brought into intimate contact with the liquid.

The leading feature of the invention comprises a pan or receptacle whose forward end is, for a reason hereinafter appearing, preferably made outwardly flaring, a series of agitators or scrapers extending transversely across the pan with their lower ends adjacent to the bottom thereof, these scrapers being hinged to a suitable support in such manner that they are adapted to swing freely in one direction, together with means for imparting a reciprocatory movement simultaneously to said support, and consequently to the scrapers in a horizontal plane, the construction being as hereinafter described, whereby ore fed in at the rear end of the pan will be advanced progressively through the liquid by the several scrapers in their forward reciprocation and automatically discharged from the latter by the action of the forward scraper or otherwise removed from said pan.

The invention also relates to certain features and details hereinafter described and pointed out.

Referring to the accompanying drawings, 1 is a pan or receptacle having outwardly-flaring ends.

2 is a bar extending longitudinally over the top of the pan and pivotally connected by a link-rod 3 to a wheel or crank 4 upon a shaft 5, that is journaled in a bracket 6, projecting from the rear end of the pan. This shaft is driven by any suitable means, such as by a power-driven belt (not shown) passing over a pulley 7 on said shaft. Bar 2 passes between rollers 8, that are supported on the top of the pan in order to maintain it (the bar) in proper position when reciprocated through the rotation of the shaft, as hereinafter described. Fastened to and depending from the said bar is a series of hangers 9, to whose lower ends, respectively, are secured horizontal bars 10, from which depend scrapers 11, extending transversely across the pan and whose lower ends are closely adjacent to the bottom of the latter. These scrapers are hinged to the bars 10 and adapted to normally occupy the position shown in the drawings—that is, the ends adjacent to the bottom of the pan—from which position they may be swung in one direction, but not in the opposite direction by reason of the upper end abutting against the bars 10, the latter forming a stop.

The bottom of the pan is in this instance, in which the apparatus is designed for use in a cyanid process, covered by a plate 12 of carbon (anode) or other suitable electric conducting material, and above the bars 10 within the pan and at each side of the vertical bars 9 are series of horizontal (cathode) plates 13, that are secured to the sides of the pan, or single plates, one extending lengthwise of the pan on one side of bars 9 and the other at the other side, may be used. Beneath these cathode-plates are suspended filter-screens 14, of suitable material, which I sometimes use. The plate 12 is connected by conductor-wires 15 to the positive pole of a battery or dynamo and the plates 13 by similar wires 16 with the negative pole.

The mode of operation of the invention is as follows: The pan is charged with the liquid electrolyte, such as cyanid of potassium, and the ore is placed or fed in at the rear end of the pan—that is, into the space back of the first one of the series of scrapers, being the one to the right of the drawings—the ore descending to the bottom of the pan. The bar 2 is now caused to reciprocate by driving the shaft 5 as in the direction of the arrow in Fig. 1, whereupon the scrapers are first moved backwardly, and in so doing, owing to the resistance of the liquid and ore, they will swing forward on their hinges, and on the return reciprocation they will also by the resistance of the liquid and ore be caused to assume the normal or vertical position. On this forward reciprocation the rear one of the scrapers will carry forward a portion of the ore, and the operation being repeated continuously the ore will be carried forward and brought into intimate contact with the agitated liquid progressively by the several scrapers until when it, the ore, has been advanced to the forward end of the pan—that is, in front of the forward scraper—it may be removed from time to time. I prefer, however, to make that end of the pan outwardly flaring, as shown, so that a portion of the ore advanced by said scrapers will at each forward reciprocation thereof be "forced," so to say, automatically out over the top of that end of the pan. As the liquid in front of said forward scraper will flow back over the top of the scraper and through the spaces between the ends thereof and the sides of the pan, none of the liquid will be forced out of the latter, although in practice the level of the liquid would be below the top of the pan. The scrapers coming closely adjacent to the plate 12 keep the latter clean and at the same time insure the carrying forward of practically all of the ore in front of the scrapers. When it is desired to conveniently treat the ore a second time, I employ a duplicate of the apparatus described and place the pan thereof in such position, as shown in Fig. 1, that the ore forced from the first pan, as described, will be discharged into the second pan. In such case the bar 2 may be extended over the latter pan, the scrapers within the same being connected with said bar, thereby avoiding the necessity of duplicating the bar and mechanism for reciprocating the same.

When the apparatus is to be used for treatment of ores by other processes in which a liquid agent is used to act on the ores and in which electricity is not employed—as, for example, in a leaching process by sulfuric acid—the anode and cathode plates may be dispensed with.

It is not essential that the scrapers or agitators shall be vertical, as they may be suitably inclined with relation to the bottom of the pan, if desired.

Having thus described my invention, I claim as new and desire to secure by Letters Patent—

1. The combination of the pan having the outwardly-inclined forward end, the series of hinged scrapers extending adjacent to the bottom of the pan and adapted to swing forwardly and means for stopping the same from swinging backwardly, a support to which said scrapers are hinged, and means for reciprocating said support, substantially as set forth.

2. The combination of the pan, the reciprocatory bar, rollers carried by the pan for supporting and guiding the bar, the series of hinged scrapers connected with said bar and extending adjacent to the bottom of said pan, and adapted to swing in one and the same direction, and means for stopping the same from swinging in the opposite direction, substantially as and for the purpose set forth.

3. The combination of the pan having the outwardly-inclined forward end, the longitudinally-movable bar, means for supporting and guiding the same, means for imparting a reciprocatory motion thereto, the series of hinged scrapers extending adjacent to the bottom of the pan, and connected with said bar, and adapted to swing forwardly, and means for stopping the same from swinging backwardly, substantially as and for the purpose set forth.

4. The combination of the pan, the longitudinally-movable bar, means for reciprocating the same, the hangers secured to and depending from said bar, the transverse horizontal bars secured to the latter, the scrapers hinged to said transverse bars, respectively, and extending adjacent to the bottom of said pan, and adapted to swing in one and the same direction, and means for stopping the same from swinging in the opposite direction, substantially as and for the purpose set forth.

5. The combination of the pan, the series of hinged scrapers extending adjacent to the bottom thereof, and adapted to swing in one and the same direction, means for stopping the same from swinging in the opposite direction, means for reciprocating said scrapers simultaneously, the anode-plate in the bottom of the pan, and the cathode plates, or plate, below the top of the pan and above said scrapers, substantially as and for the purpose set forth.

6. The combination with a pan, of a reciprocatory bar extending longitudinally thereof, a bracket carried by said pan, a shaft journaled upon said bracket, a wheel or crank carried by said shaft and to which said bar is pivotally connected, a series of hinged scrapers connected with said bar and adapted to swing in one and the same direction, and means for preventing said scrapers swinging in the opposite direction.

7. The combination of the pan, the series of hinged scrapers extending adjacent to the bottom thereof, and adapted to swing in one and the same direction, means for stopping the same from swinging in the opposite direction, means for reciprocating said scrapers simultaneously the anode-plate in the bottom of the pan, the cathode plates or plate below the top of the pan and above said scrapers, and the filter-screens beneath said cathode plates or plate, substantially as and for the purpose set forth.

In testimony whereof I have hereunto affixed my signature this 27th day of June, A. D. 1902.

GEORGE W. STEAD.

Witnesses:
ANDREW V. GROUPE,
WALTER C. PUSEY.